F. W. SCHWIERS.
Apparatus for Hitching and Securing Runaway Horses.
No. 199,381. Patented Jan. 22, 1878.
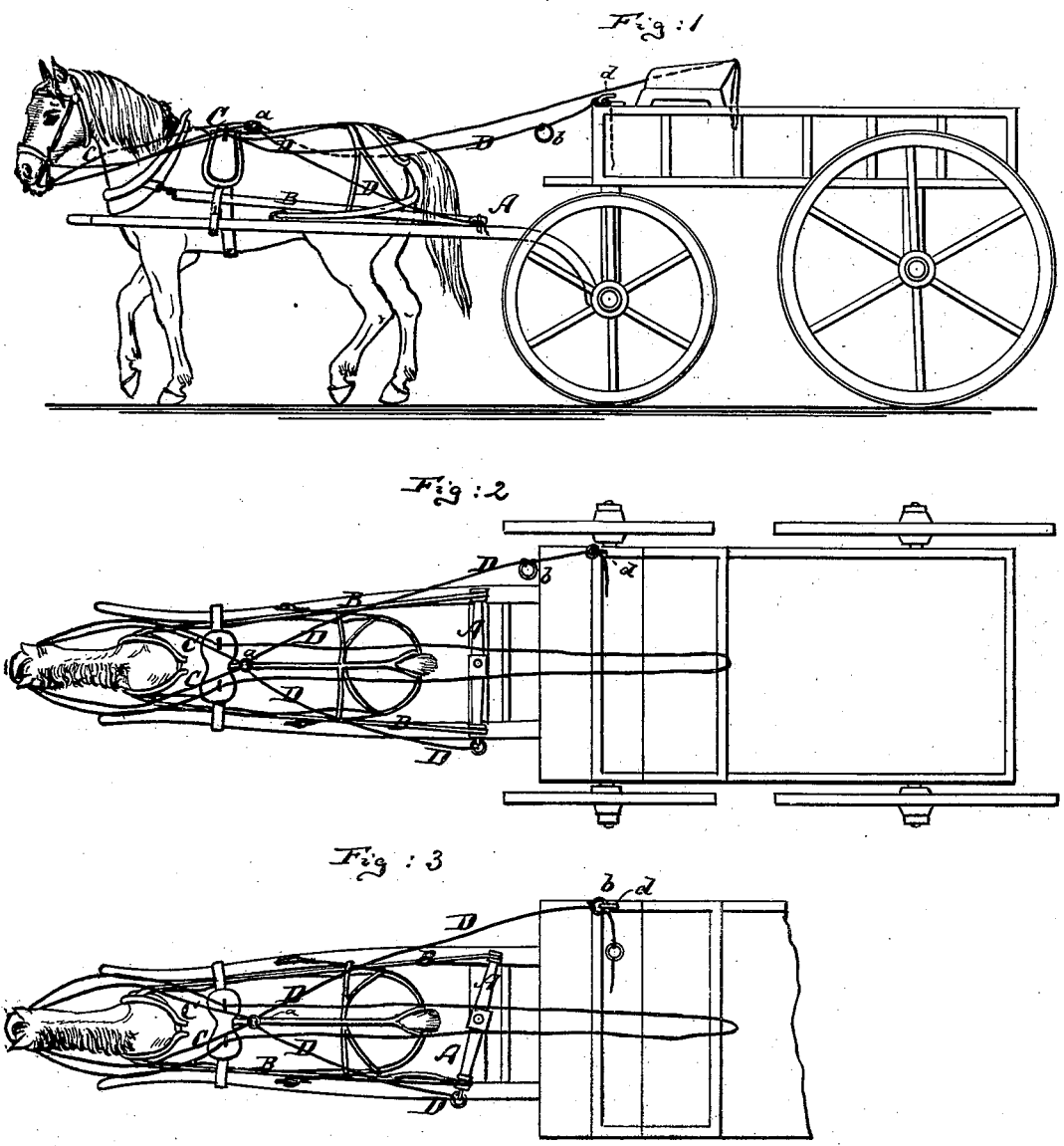

UNITED STATES PATENT OFFICE.

F. WILLIAM SCHWIERS, OF NEW YORK, N. Y.

IMPROVEMENT IN APPARATUS FOR HITCHING AND SECURING RUNAWAY HORSES.

Specification forming part of Letters Patent No. 199,381, dated January 22, 1878; application filed December 24, 1877.

*To all whom it may concern:*

Be it known that I, F. WILLIAM SCHWIERS, of New York city, county and State of New York, have invented a new and useful Improvement in Apparatus for Hitching and Securing Runaway and other Horses, of which the following is a specification:

Figure 1 is a side view of a vehicle, showing the harness provided with my improvement. Figs. 2 and 3 are top views thereof, showing the parts in different positions.

Similar letters of reference indicate corresponding parts in all the figures.

The object of this invention is to provide simple and inexpensive means for hitching horses, and also for preventing them from running away.

The invention is applicable to such animals as have to make frequent stoppages—as, for instance, on milk-routes, where it is not practicable to hitch the horse at every stoppage; and it is also applicable to teams and single horses, where there is any danger of the animals running away.

The invention consists in combining, with a check-rein and with a whiffletree, a strap that connects with one end to the whiffletree, passes through the check-rein, and leads back to the driver's seat, in manner hereinafter described.

In the drawings, the letter A represents the whiffletree of a suitable vehicle, B B being the traces by which the horse is hitched to the whiffletree. C is a check-rein, which connects in suitable manner with the check-pieces of a curb-bit, and extends back, preferably, behind the saddle of the harness. A suitable loop or ring, *a*, is secured or formed in the back part of the rein C, to allow a strap, D, to be passed through the same. This strap D is at one end secured by suitable means to one end of the whiffletree A, and is then drawn through the check-rein or through the ring *a* thereon. The other end of the strap D extends to the driver's seat, or within convenient reach of the driver. While the horse is in motion the strap D is slackened, so as to not interfere with any part of the harness which is used in drawing the vehicle forward.

When it is desired to hitch the horse, it is only necessary to draw the strap D tight and secure it by a suitable ring, *b*, to a suitable hook or projection, *d*, of the vehicle, as shown in Fig. 3. By thus drawing the strap D tight that end of the whiffletree with which the strap D connects is drawn forward, and the trace on the same side slackened, while the trace on the other side is drawn tight. If the horse should now attempt to move forward, it would necessarily draw on the taut trace, and thereby swing the whiffletree on its pivot, and draw on the strap D and on the check-rein, which will curb the animal and cause it to desist from the attempted motion. In the same manner will the motion of the animal be impeded should it attempt to run away, by merely drawing the strap D tight, and thereby so placing the whiffletree that all further attempts of the animal to move forward will cause a painful drawing of the check-rein.

It will be perceived that the invention is very simple; and that it can be applied either to single or double harness by the mere addition of the strap D. Its efficiency has been fully tested.

I claim—

The combination of the strap D with the whiffletree A and check-rein C, said strap being secured to one end of the whiffletree and passed through the check-rein, or through a ring connected thereto, substantially as herein shown and described.

F. WILLIAM SCHWIERS.

Witnesses:
 PHILIP KUHLER,
 T. B. MOSHER.